United States Patent [19]
Kahlke et al.

[11] Patent Number: 6,076,517
[45] Date of Patent: Jun. 20, 2000

[54] ARRANGEMENT FOR ADJUSTING THE GAS SUPPLY AND THE CONTROL OF AN OPERATING PRESSURE TO A GAS COOKING APPARATUS HAVING A GAS-RADIATION BURNER MOUNTED BELOW A COOKING SURFACE

[75] Inventors: Michael Kahlke, Bingen-Sponsheim; Christof Köster, Budenheim; Rainer Hasse, Mainz, all of Germany

[73] Assignee: Schott Glas, Mainz, Germany

[21] Appl. No.: 08/929,800

[22] Filed: Sep. 15, 1997

[30]       Foreign Application Priority Data

Sep. 16, 1996 [DE] Germany .............................. 196 37 666

[51] Int. Cl.$^7$ ................................ F24C 3/00; B05B 1/14
[52] U.S. Cl. .................... 126/39 J; 126/39 E; 126/39 K; 126/39 N; 126/39 R; 239/552
[58] Field of Search .................................. 126/39 J, 39 E, 126/39 K, 39 N, 39 R; 239/552

[56]           References Cited

U.S. PATENT DOCUMENTS

| | | |
|---|---|---|
| 1,584,210 | 5/1926 | Brunow .................................... 239/567 |
| 2,210,069 | 8/1940 | Ensign ..................................... 239/552 |
| 4,083,355 | 4/1978 | Schwank . |
| 4,201,184 | 5/1980 | Scheidler et al. . |
| 4,673,349 | 6/1987 | Abe et al. . |
| 4,951,646 | 8/1990 | Diekmann et al. . |
| 5,509,403 | 4/1996 | Kahlke et al. . |
| 5,937,846 | 8/1999 | Martin et al. .......................... 126/39 E |

FOREIGN PATENT DOCUMENTS

| | | | |
|---|---|---|---|
| 2692024 | 12/1993 | France | ................................. 126/39 R |
| 33 15 745 | 10/1984 | Germany . | |
| 38 44 081 | 7/1990 | Germany . | |
| 39 34 562 | 11/1990 | Germany . | |
| 42 25 789 | 2/1993 | Germany . | |
| 43 26 945 | 2/1995 | Germany . | |
| 2230595 | 10/1990 | United Kingdom . | |

*Primary Examiner*—Ira S. Lazarus
*Assistant Examiner*—David Lee
*Attorney, Agent, or Firm*—Walter Ottesen

[57]              ABSTRACT

The invention is directed to an arrangement for adjusting a pressure-fluctuation free supply of gas and for controlling an operating pressure of an air/gas mixture to a radiation-gas burner of a gas cooking apparatus. The radiation-gas burner has a burner chamber and is mounted in a housing below a cover plate. The arrangement includes a gas supply conduit connectable to a gas source for receiving the gas and a pressure controller is mounted in the gas supply conduit for controlling the pressure of the gas to a constant operating pressure of at least 2.5 mbar above atmospheric pressure. A control unit is connected to the pressure controller for receiving the pressure-controlled gas and for metering the gas to the radiation-gas burner. The control unit includes a valve block having at least one exchangeable nozzle adapted to the type of gas from the gas source and a feed conduit has a clear cross-sectional area and communicates with the burner chamber. The feed conduit has an inlet opening adjacent the nozzle. A blower blows air into the apparatus to generate an overpressure whereby the gas metered by the control unit through the nozzle entrains air to form an air/gas mixture entering the feed conduit. An insert is mounted in the feed conduit for reducing the cross-sectional area of the feed conduit. The insert is selected so as to reduce the cross-sectional area to enable the radiation-gas burner to operate at a predetermined efficiency irrespective of the fluctuations in the pressure of the gas and the changes in type of the gas.

2 Claims, 2 Drawing Sheets

ARRANGEMENT FOR ADJUSTING THE GAS SUPPLY AND THE CONTROL OF AN OPERATING PRESSURE TO A GAS COOKING APPARATUS HAVING A GAS-RADIATION BURNER MOUNTED BELOW A COOKING SURFACE

FIELD OF THE INVENTION

The invention relates to an arrangement for adjusting a pressure-fluctuation free gas supply and the control of an operating pressure to a gas cooking apparatus. The operating pressure is the gas pressure necessary for the operation of a burner. The gas cooking apparatus has at least one gas-radiation burner mounted below a continuous cooktop made of a material such as glass ceramic, glass, ceramic or similar material. This material is permeable for thermal radiation. The gas-radiation burner includes a combustion chamber and a burner plate made of fiber material. The gas cooking apparatus also includes the usual ignition, safety and temperature monitoring units as well as exhaust-gas channels for conducting the combustion gases away. The arrangement of the invention further includes a control unit for the gas supply and this control unit includes a valve block having a magnetic control and nozzles adaptable to various types of gas. The nozzles can be exchanged and are positioned in the block. The control unit for the gas supply is located in a space which communicates with the combustion chamber via lines which are gas tight at their peripheral surfaces.

BACKGROUND OF THE INVENTION

Gas cooking apparatus having gas-radiation burners, glass-ceramic cook plates and control units for the gas supply are disclosed, for example, in German patent publications 3,934,562 and 2,621,801 and U.S. Pat. 3,468,298; 4,083,355 and 4,201,184.

In gas-radiation burners, the gas is combusted at the surface of a burner plate comprising a porous ceramic. In gas cooking apparatus, one or more of such gas-radiation burners are arranged at a spacing below a common glass-ceramic plate known per se. A cooking position is defined by each burner at the upper side of the glass-ceramic plate. Each individual gas-radiation burner is provided with an ignition device and protected by an ignition safety device against an outflow of uncombusted gas mixture. A burner plate of this kind is disclosed, for example, in European patent publication 0 187 508.

The temperature of the radiating burner plate lies in the range between approximately 900° C. and 950° C. depending upon the temperature properties of the material. The maximum gas quantity which can be supplied to the burner is limited by constructive measures via control devices so that a maximum operating temperature cannot be exceeded, for example, to protect the material of the burner plate or the cooking surface and also to avoid unwanted energy losses.

The permissible maximum temperature of glass-ceramic cook plates lies usually between approximately 700° C. and 750° C.

For an adjusted high power, temperatures of 900° C. and more can occur within a short time in the glass-ceramic plate because of pots having unsuitable bases (especially uneven bases) or when cooking positions are tightly occupied. For this reason, a temperature limiter is provided to protect the glass-ceramic plate. With the temperature limiter, such over-temperatures can be reliably prevented. Such temperature limiters are described in detail, for example, in German patent publication 2,621,801 and in U.S. Pat. No. 4,201,184.

For heating a cooking area, a control (closed loop or open loop) of the power of the burner must be provided in addition to a limitation on temperature. Two principles are known to control the power: in the first principle, the burner is continuously operated and the supplied gas quantity is decreased or increased in correspondence to the required power. According to the second principle, the burner is driven in a clocked manner, that is, the burner is always driven with the maximum gas quantity and the required power is obtained from the ratio of the switch-on time to the switch-off time (pulse duty factor).

German patent publication 3,315,745 discloses a cooking field including: gas-heated burners; a continuous cook plate of glass ceramic or a comparable material with at least two clearly separated cooking zones, which have separate burner locations assigned thereto; a warm-holding zone; exhaust-gas channels for conducting the combustion gases away; and ancillary units. The burner locations include burner chambers, gas-mixing chambers, gas-mixing devices and control devices. The burner locations, the warm-holding zone and the exhaust-gas channels at the regions, which do not serve the heat transfer to the cooking field, as well as all components of the burner locations are surrounded by a component comprising low mass and heat insulating material which is in common with these parts.

German patent publication 3,315,745 discloses that the necessary overpressure in the mixture chamber is reached by only a cross-sectional narrowing within a combustion-mixture supply channel. For this gas-mixing device, a conical bore together with the gas nozzle is effective as an injector through which the combustion air is drawn in by suction.

The control unit for the gas supply disclosed in German patent publication 3,315,745 has no valve blocks with exchangeable nozzles and can therefore only be adapted to different gas types with great difficulty. Furthermore, and notwithstanding the reduction in cross section within the combustion mixture supply channel, the disadvantage is present that insufficient combustion air is supplied when the gas is not injected into the combustion mixture supply channel with an adequately high prepressure. A unit with which additional air is supplied is however not provided.

German patent publication 3,844,081 discloses a cooking apparatus with at least one cooking field comprising a burner pot seated in a burner plate, a nozzle plate and a ceramic plate mounted at a spacing above the nozzle plate. An intermediate base wall is mounted below the burner pot and a compartment for open-loop control and/or closed-loop control and/or monitoring devices is provided below the intermediate base wall. An exhaust-gas discharge is provided wherein, on the rearward side of the cooking apparatus, an essentially vertical shaft is arranged which can be connected to an exhaust channel or is configured as such. A blower is mounted in the compartment for the open-loop control and/or closed-loop control and/or monitoring apparatus. The blower inducts primarily cooling air from the front end through this compartment and this cooling air is forced into the shaft. The shaft is configured as a flow channel so that the primary cooling air draws in secondary cooling air above the spacer chamber between the burner plate and the intermediate base wall and conducts away exhaust gas from the compartment between the burner plate and the ceramic plate.

German patent publication 3,844,081 provides a cooking apparatus of the described configuration with reference to controlling the heat loss and therefore to improve the same.

Here, a blower of relatively high complexity is utilized simply to remove the exhaust gas. Also, a control device adapted to different types of gas is not provided.

U.S. Pat. No. 4,020,821 discloses positioning a blower in a gas cooking apparatus equipped with a continuous plate, for example, made of glass ceramic. This blower brings in additional air for a good combustion of the gas. However, here, no gas-radiation burners having burner plates are utilized; instead, burners with an open flame are used which require different control devices.

British patent publication 2,230,595 discloses a gas hob having a glass-ceramic plate and at least one gas-radiation burner mounted closely under the plate. Each burner unit has a burner chamber with a large number of individual chambers. A burner plate made of massive ceramic is mounted above the individual chambers. The burner plate is adaptively perforated to arrange the chambers. Furthermore, the gas hob includes a gas supply and a ventilator unit to always make combustion air available when the burner unit operates.

U.S. Pat. No. 4,020,821 and British patent publication 2,230,595 both show the use of ventilators or blowers in gas cooking apparatus having continuous glass-ceramic cooking plates; however, the overall arrangement of the cooking apparatus including the control units for the gas supply are very complicated and complex and therefore correspondingly susceptible to malfunction in practical use as well as being expensive in manufacture. Furthermore, these units are inflexible with respect to a change of gas type.

None of the publications of the state of the art provide any suggestion as to pressure control units for the adjustment of a gas supply free of pressure fluctuations and for controlling to a minimum operating pressure which is necessary for the operation of a burner.

German patent publication 4,225,789 discloses that gas apparatus can be adjusted with the aid of a gas pressure controller to a specific pressure or throughput. According to this publication, the gas pressure, which is pregiven by the gas supply company, is controlled to a specific but variable desired value so that a gas prepressure results, which is reduced via a plurality of reference nozzles to the apparatus connection pressure. The reference nozzles can each be selected via a control. In this way, an adjustable gas throughput is achieved even for different gas types and input gas pressures which change. The method shown in German patent publication 4,225,789 is very complex and cannot be applied in order to be able to drive a gas-radiation burner as in the present invention for a very low gas prepressure. In such a case, the combustion air must be introduced with the support of a blower. Only in this way does the gas burn reliably and cleanly.

German patent publication 4,326,945 discloses a gas cooking apparatus with at least one gas-radiation burner having a burner chamber and a burner plate made especially of fiber material. The gas-radiation burner is arranged below a continuous cooking plate made of a material such as glass ceramic, glass, ceramic or a similar material which is permeable for thermal radiation. The gas cooking apparatus includes control units for the gas supply as well as conventional ignition, safety and temperature monitoring devices. The apparatus also includes exhaust-gas channels for conducting away the combustion gases as well as a unit, such as a blower, with which additional air is brought to the burner plate. The device with which the additional air is inducted from the outside and brought to the burner plate and the control unit for the gas supply are both located in a compartment which is partitioned off and in which an overpressure is maintained. The compartment communicates with the combustion chamber via lines which are gas tight in the region outside of the partitioned chamber (especially via tubes with the combustion chamber) and with the ambient. The control unit for the gas supply includes: a valve block which, in turn, includes especially a magnetic control; and, nozzles positioned in the block, which can be exchanged and have opening diameters of 0.5 mm to 2.0 mm (especially 1 mm) adaptable to various gas types.

It is problematic with all gas-radiation burners not equipped with their own pressure control units for maintaining a pressure-fluctuation free gas supply that such burners react very sensitively to gas pressure fluctuations. If the pressure drops off greatly below the nominal pressure, then this leads to a very air-rich gas/air mixture and therefore to a poor efficiency accompanied by reduced cooking capacity. If the pressure falls very far below nominal pressure, then this leads to a complete malfunction of the apparatus because the burner no longer ignites because of too much excess air. The pressure can fall below the nominal pressure in many countries and regions especially during winter. Italy is exemplary here where, in lieu of a normal natural gas pressure of 17 to 25 mbar, only 8 mbar can be available in winter. Without a pressure control unit, a reliable operation of the gas-radiation burners is no longer ensured. The pressure control unit supplies the control unit for the gas supply with a pressure-fluctuation free and constant operating gas pressure.

SUMMARY OF THE INVENTION

It is an object of the invention to provide an arrangement having a pressure control unit which enables a cooking apparatus to be operated with different gases without a drop in efficiency and with a uniform power. The burners of the arrangement of the invention can be configured with an atmospheric air induction (venturi principle) as well as with a blower support.

The arrangement of the invention is for adjusting a pressure-fluctuation free supply of gas and for controlling an operating pressure of an air/gas mixture to a radiation-gas burner of a gas cooking apparatus which can be connected to a gas source supplying a gas which fluctuates in pressure and changes in type. The gas cooking apparatus has a housing and a cover plate mounted atop the housing to define a cooking surface. The radiation-gas burner has a burner chamber and is mounted in the housing below the cover plate. The arrangement includes: a gas supply conduit connectable to the gas source for receiving the gas; a pressure controller mounted in the gas supply conduit for controlling the pressure of the gas to a constant operating pressure of at least 2.5 mbar above atmospheric pressure; a control unit connected to the pressure controller for receiving the pressure-controlled gas and for metering the gas to the radiation-gas burner; the control unit including a valve block having at least one exchangeable nozzle adapted to the type of gas from the gas source; a feed conduit having a clear cross-sectional area and communicating with the burner chamber; the feed conduit having an inlet opening adjacent the nozzle; blower means for blowing air into the housing to generate an overpressure therein whereby the gas metered by the control unit through the nozzle entrains air to form an air/gas mixture entering the feed conduit for combustion in the burner; an insert mounted in the feed conduit for reducing the cross-sectional area of the feed conduit; and, the insert being selected so as to reduce the cross-sectional area to enable the radiation-gas burner to operate at a predetermined efficiency irrespective of the fluctuations in the pressure of the gas and the changes in type of the gas.

The statement of the gas pressure in "mbar" is an absolute statement. According to the invention, a pressure is meant which lies by the given value in mbar above atmospheric pressure (1013 mbar).

According to the invention, the cross-section reducing elements, which are configured as injectors, are narrowed in the input region of the gas-tight lines by as much as 15% of the tube cross section for an operating gas pressure of 7 mbar.

The pressure dependency can be substantially precluded with the use of a pressure controller in accordance with the invention. Such pressure controllers are characterized by their large input pressure range of, for example, 5 to 100 mbar at a constant output pressure of 7 mbar, for example. In this way, seasonal influences and/or influences of the gas network can be eliminated.

A constant operating pressure of 5 to 8 mbar is wanted in order that a cooking apparatus can be operated without a drastic reduction in efficiency or in the power capacity.

Gas-radiation burners (for example on a cordierit basis) operate at such a low operating pressure only atmospherically with a very high technical and constructive complexity; that is, the air induction can be inadequate because of this reduced pressure. The existing exhaust-gas norms for cooking apparatus can only barely be maintained under such conditions.

A blower supported burner which forms the basis of this invention is independent of an atmospheric induction. The combustion air can be adjusted by a suitable configuration of the injector cross section. This leads to excellent exhaust-gas values and efficiency over the entire pressure and gas type range. For a blower-supported burner, the burner plate can be operated without additional openings without difficulty at optimal efficiency.

According to the invention, the pressure control unit can be mounted within or outside of the cooking field of the cooking apparatus.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
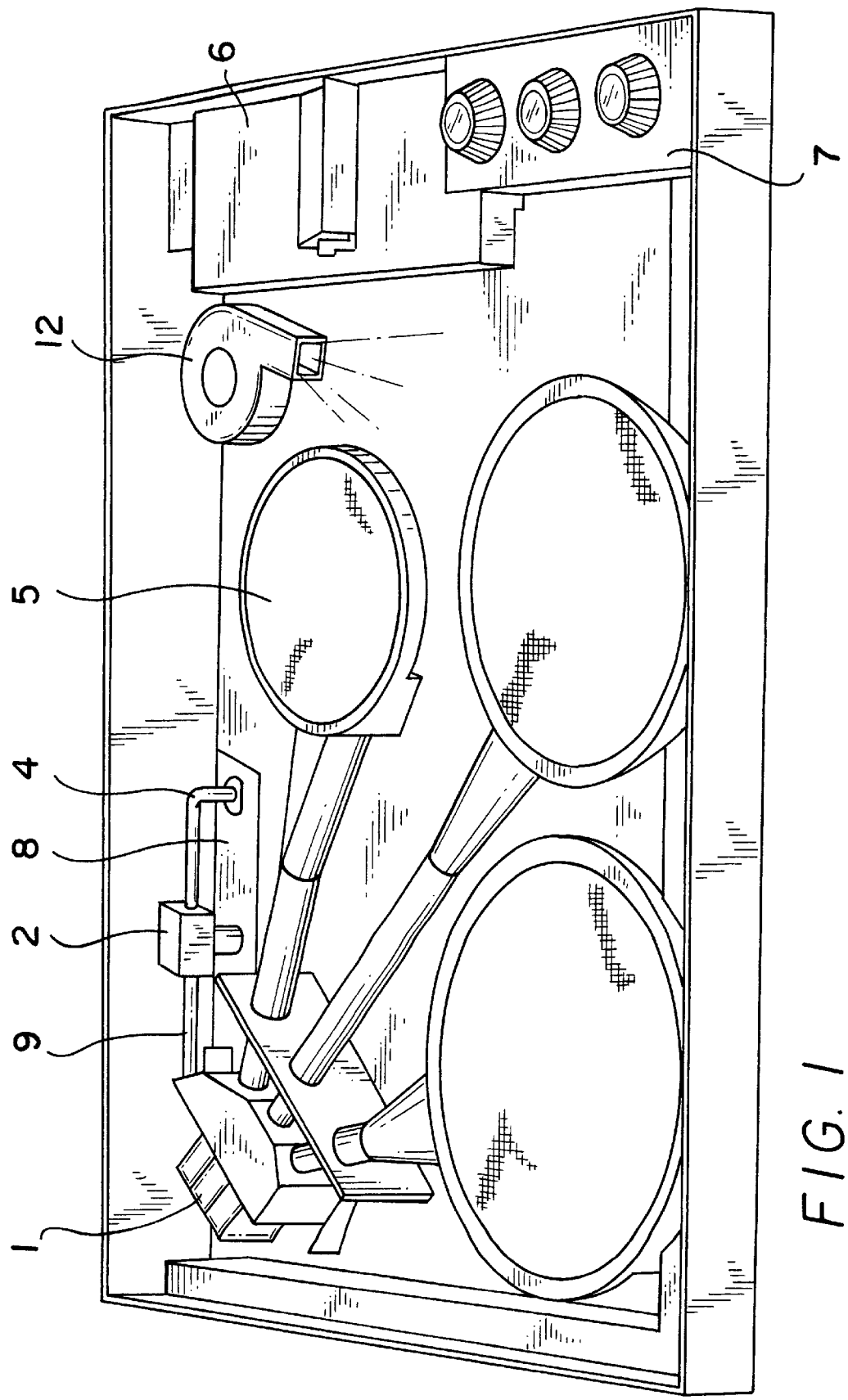
FIG. 1 is a schematic of a gas cooking apparatus wherein the insulation of the upper part, which is necessary for conducting away the exhaust gas, and the glass-ceramic cook plate are not shown for the sake of clarity; and, FIG. 2 is a schematic showing, inter alia, the gas inlet stub 4, a pressure controller 2 and the gas control unit 1, all mounted on a common carrier plate 8.
Figure 2:
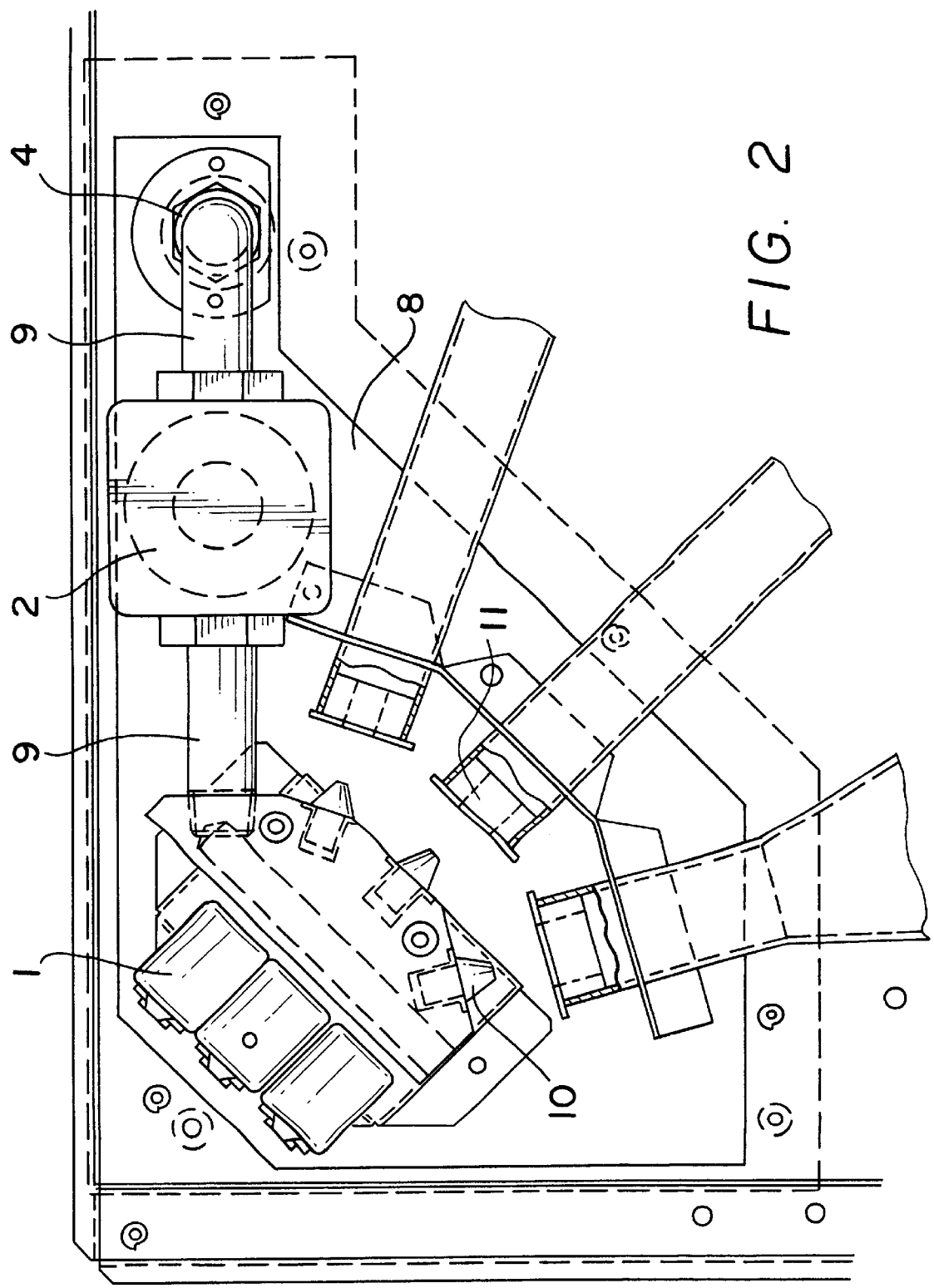

A gas cooking apparatus of the kind shown in FIGS. 1 and 2 is disclosed, for example, in U.S. Pat. No. 5,509,403 incorporated herein by reference.

Referring to FIG. 1, the component assembly, which forms the basis of the invention, is formed by the gas inlet stub 4, the pressure controller 2 and the gas control unit 1. A commercially available apparatus is used as a pressure controller 2 and is available from the Maxitrol Company (U.S.A.) under the product designation RV 47 ML. All components are mounted on a common carrier plate 8. An assembly in the form of a component group (module) is especially advantageous because this module is separately manufactured, tested as to tightness and can be supplied directly to the location where final assembly takes place.

The following are also shown: the control circuit board 6, the energy adjusting block 7, the burner 5 having a fiber mat comprising SiC fibers and a blower 12.

The gas control unit 1 is, with respect to its geometric configuration, so dimensioned that always straight tubes 9 are used as this is advantageous for cost reasons. The pressure controller 2 is so configured that only a minimum space requirement is needed.

This construction permits an exchange of nozzles 10 and/or an exchange of air injectors (inserts) 11 to be carried out simply and quickly. It is not necessary to disassemble the cooking area with many time consuming steps in order to reach the nozzles 10. Only the carrier plate 8 need be disconnected by removing threaded fasteners; then, direct access to the nozzles and injectors is provided.

In summary, the advantages of the invention are listed below:

(a) pressure-fluctuation free gas supply to the burner;
(b) a constant adequate operating pressure of the gas in the burner;
(c) constant air supply to the burner;
(d) uniform low exhaust-gas emissions as a function of a constant gas pressure;
(e) optimal exhaust-gas values and efficiencies;
(f) constant start cooking time independent of regional and/or seasonal gas pressure fluctuations in the gas supply lines;
(g) the use of city gas is simplified thereby; and,
(h) a pressure control unit optimal in each case is usable for different types of gas and different gas pressure ranges.

It is understood that the foregoing description is that of the preferred embodiments of the invention and that various changes and modifications may be made thereto without departing from the spirit and scope of the invention as defined in the appended claims.

What is claimed is:

1. A cooking assembly which is supplied from a gas source supplying a gas which fluctuates in pressure and changes in type, the cooking assembly comprising:

a housing;

a cover plate mounted atop said housing to close said housing and define a continuous cooking surface;

a radiation-gas burner mounted in said housing below said cover plate;

said radiation-gas burner having a burner chamber; and, an arrangement for providing a pressure-fluctuation free supply of said gas and for controlling an operating pressure of an air/gas mixture to said radiation-gas burner, said arrangement including:

a gas supply conduit connectable to said gas source for receiving said gas;

a pressure controller mounted in said gas supply conduit for controlling the pressure of said gas to a constant operating pressure of at least 2.5 mbar above atmospheric pressure;

a control unit connected to said pressure controller for receiving the pressure-controlled gas and for metering said gas to said radiation-gas burner;

said control unit including a valve block having at least one exchangeable nozzle adapted to the type of gas from said gas source;

a feed conduit having a clear cross-sectional area and communicating with said burner chamber;

said feed conduit having an inlet opening adjacent said nozzle;

blower means for blowing air into said housing to generate an overpressure therein whereby said gas metered by said control unit through said nozzle entrains air to form an air/gas mixture entering said feed conduit for combustion in said burner;

an insert mounted in said feed conduit for reducing said cross-sectional area of said feed conduit;

said insert being selected so as to reduce said cross-sectional area to enable said radiation-gas burner to operate at a predetermined efficiency irrespective of the fluctuations in said pressure of said gas and said changes in type of said gas;

a carrier plate; and, said pressure controller, said control unit and said gas supply conduit all being mounted in common on said carrier plate to form a single component assembly unit mounted in said housing.

2. The cooking assembly of claim 1, wherein said insert is selected to reduce said clear cross-sectional area down to 15% thereof for an operating pressure of said gas from said gas source of 7 mbar above said atmospheric pressure.

* * * * *